F. M. CRANE.
VEHICLE ATTACHMENT.
APPLICATION FILED JUNE 6, 1916.
1,241,344. Patented Sept. 25, 1917.
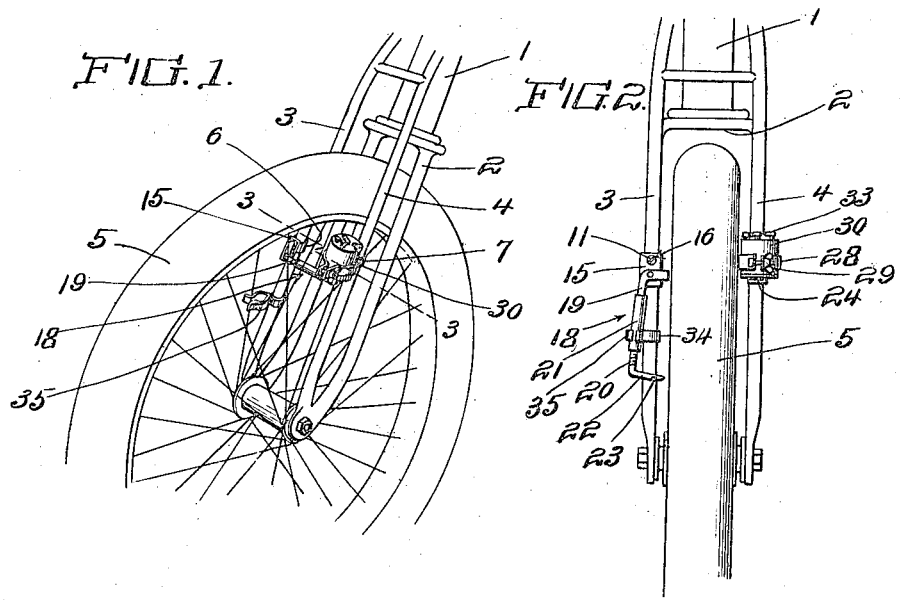
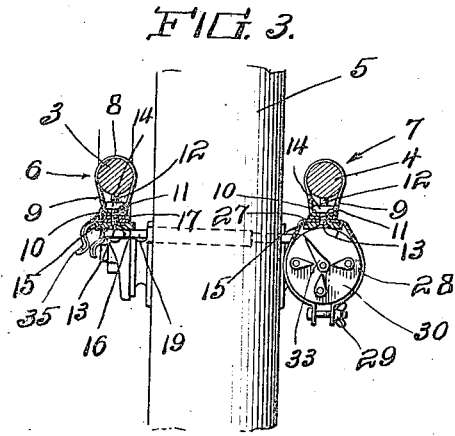
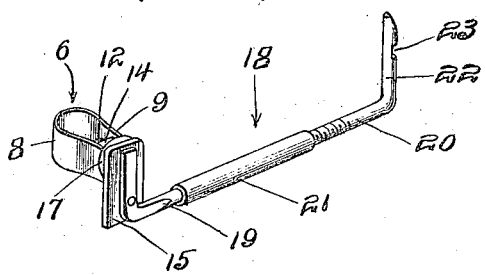
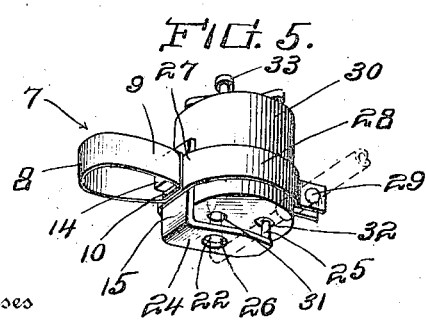
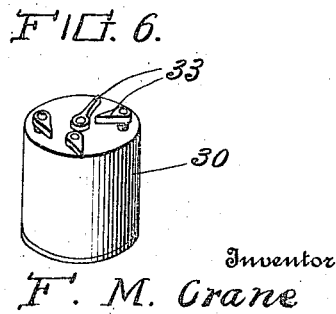
Inventor
F. M. Crane
Witnesses
A. E. Newkirk
Frank Hough
By Victor J. Evans
Attorney

UNITED STATES PATENT OFFICE.

FREDERICK M. CRANE, OF HALSEY, OREGON.

VEHICLE ATTACHMENT.

1,241,344.  Specification of Letters Patent.  Patented Sept. 25, 1917.

Application filed June 6, 1916. Serial No. 102,007.

*To all whom it may concern:*

Be it known that I, FREDERICK M. CRANE, a citizen of the United States, residing at Halsey, in the county of Linn and State of Oregon, have invented new and useful Improvements in Vehicle Attachments, of which the following is a specification.

This invention relates to an attachment which may be applied to a bicycle, motorcycle, or vehicles of similar character.

The primary object of the invention is to provide an attachment which may be quickly and easily applied to a vehicle of the character described and is so constructed that it may be used to prevent an unauthorized person from using the vehicle.

Another object of the invention is to provide the attachment with a bracket for connection with the frame of a vehicle and having connected therewith a bolt adapted to be passed between the spokes of a wheel on the vehicle and engaged with a lock carried by another bracket also connected with the frame of the vehicle, thus locking the wheel against turning movement.

A further object of the invention is to provide the bracket with a bolt which is adjustable, so that the attachment may be connected with the frame of machines of different makes.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as alterations within the scope of the claims may be resorted to when desired.

Like characters of reference denote corresponding parts throughout the several views in the drawing, in which:

Figure 1 is a perspective view of a portion of a motorcycle showing the improved attachment applied to the frame thereof and the bolt which is connected with one of the brackets of the attachment passed between the spokes of the wheel and engaged with the lock to hold the wheel against turning movement.

Fig. 2 is a front elevation of the portion of a motorcycle showing the bolt disengaged from the lock and removed from between the spokes of a wheel.

Fig. 3 is a horizontal transverse sectional view on the line 3—3 of Fig. 1.

Fig. 4 is a perspective view of one of the brackets included in the attachment removed from the frame of the motorcycle to more clearly illustrate the construction of the bolt for connection with the lock included in the attachment.

Fig. 5 is a detail perspective view of the other bracket included in the attachment and showing the same disconnected from the frame of the motorcycle.

Fig. 6 is a detail perspective view of the lock for connection with the bolt for holding the wheel of the motorcycle against turning movement.

Referring now to the drawing in detail, the numeral 1 designates a portion of the frame of a motorcycle having a steering fork 2 between the arms 3 and 4 of which is mounted the front wheel 5.

Brackets 6 and 7 for connection with the arms 3 and 4 are each formed from a strip of material 8 bent between its ends to form spaced and parallel arms 9, said arms being again bent to provide over-lapping portions 10 provided with registering openings 11. The threaded shank 12 of a screw 13 passes loosely through the openings 11 and holds the ends of the arms in over-lapping relation and the portion of the shank which is arranged between the arms has mounted thereon a nut 14 held against turning movement on the shank 12 by the arms 9.

A plate 15 is provided near one end with a threaded opening 16 receiving the threaded shank of the screw 11 and spaced from the over-lapping ends of the arms 9 by spacing disks 17 also mounted on the shank 12 of the screw 13.

From the above described manner of forming the brackets 6 and 7, it will be seen that when the screw 13 has been disconnected from the over-lapping ends of the arms 9 the strip of material may be connected with an arm on the frame and that when the screw is again passed through the openings in the over-lapping ends of the arms and connected with the nut and plate, the screw may be adjusted to cause the end thereof which is received between the arms 9 thereof to bear against an arm on the frame thus binding the bracket to the frame of the machine.

A bolt 18 is formed from sections 19 and 20 with the section 19 having one end thereof pivotally connected with the plate 15 on the bracket 6, said section 19 being provided with a hollow and cylindrical portion 21 interiorly threaded to receive the threaded portion of the section 20, thus rendering the bolt adjustable.

The section 20 has a portion thereof near one end bent at right-angles to the section to form an arm 22, said arm being notched, as at 23, for a purpose which will be hereinafter described.

The plate 15 on the bracket 7 is provided with an arm 24 arranged at right-angles to the plate and provided at its free end with a reduced extension forming a retaining finger 25 arranged at right-angles to the arm 24, said arm having formed therein between its ends a circular opening 26.

A clamp 27 is connected with the plate 15 on the bracket 7 by the screw 13, said clamp being arranged between the plate and the over-lapping ends on the arms 9 of the bracket 7 and provided with gripping arms 28, the free ends of which are connected by an adjusting device 29.

A combination lock 30 is received between the arms 28 of the clamp 27 and supported on the arm 24 of the plate 15 on the bracket 7, said lock being provided in the bottom thereof with an opening 31 registering with the opening 26 in said arm to receive the arm 22 on the bolt, when said bolt is passed between the spokes of a wheel.

The combination lock 30 is further provided in its bottom with an opening 32 receiving the retaining finger 25 to prevent turning movement of the lock within the arms 28 of the clamp when the operating arms 33 of the lock are turned to enable the arm on the bolt to be connected with the lock or removed therefrom.

The arm 3 of the frame of the vehicle is provided with a latch 34 having spaced and resilient arms 35 between which may be positioned the locking bolt or staple 18 when disconnected from the lock 30, said arms serving to prevent swinging movement of the bolt when the vehicle is in motion.

When the brackets 6 and 7 have been applied to the frame of the vehicle and it is desired to lock a wheel on the vehicle against turning movement so that the vehicle can not be used by an unauthorized person, the bolt 18 is turned about its pivotal connection with the plate 15 on the bracket 6 so that the bolt may be passed between the spokes of a wheel and have the arm thereon inserted within the combination lock 30 through the openings in the lock and arm on the plate 15 on the bracket 7.

The operating arms 33 are now adjusted to prevent the arm 22 of the bolt from being withdrawn from the lock thus holding the bolt between the spokes of the wheel and preventing the turning of the wheel.

When it is desired to disconnect the arm 22 from the combination lock, the operating arms 33 are adjusted so that the arm may be withdrawn from the lock and the bolt 18 disposed between the arms 35 on the latch 34.

By providing the attachment with a bolt which is adjustable and constructing the brackets 6 and 7, so that they may be adjusted on the arms of the frame of the vehicle, the attachment may be used on vehicles of different makes and used to lock wheels against turning movement which vary in diameter.

From the foregoing description, taken in connection with the accompanying drawing, it is at once apparent that an attachment for wheels has been provided which is simple in construction, inexpensive of manufacture, yet highly efficient in use.

Having thus described the invention, what is claimed as new, is:

1. In a device of the class described, a lock and a support for said lock including a plate, a strip of material at one end of said plate bent upon itself to provide a bracket having spaced sides, overlapping portions on said sides and one end of said bracket, a clamp interposed between the overlapping portions of said sides and plate, a binding screw passing through said plate, the clamp and the overlapping portions of said sides, and a nut on said screw between the sides of said bracket and engaged thereby.

2. In a device of the class described, a lock and a support for said lock comprising a plate, a clamp at one end of said plate, a bracket at one end of said clamp, means for connecting the bracket, the clamp, and the plate, an arm at the other end of said plate underlying said bracket and having an opening therein, and a finger at one end of said arm.

3. In a device of the class described, a lock and a support for said lock comprising a plate having an angularly extending arm at one end thereof, a bracket upon the opposite side and at the other end of said plate, a clamp above said arm passing between said plate and bracket and connected therewith, said clamp having spaced arms thereon, a binding screw connecting said arms, and a nut on said screw bearing against one of said arms.

In testimony whereof I affix my signature.

FREDERICK M. CRANE.